United States Patent [19]
Tisell et al.

[11] 4,108,005
[45] Aug. 22, 1978

[54] VEHICLE DECELERATION SENSING DEVICE

[75] Inventors: Claes Gustav Erik Yngve Tisell, Strängnäs; Lars-Göran Svensson, Upsala; Gustav Sven Erik Karlstedt; Gustav Yngve Thorstensson, both of Sollentuna; John Fredrik Alf Hartmann, Djursholm, all of Sweden

[73] Assignee: Forenade Fabriksverken, Eskilstuna, Sweden

[21] Appl. No.: 789,650

[22] Filed: Apr. 21, 1977

[51] Int. Cl.² .................. G01P 15/02; B60R 21/02
[52] U.S. Cl. ................................................. 73/514
[58] Field of Search ................. 73/492, 514, 515; 200/61.45 R, 61.53; 340/52 H

[56] References Cited

U.S. PATENT DOCUMENTS

| | | | |
|---|---|---|---|
| 2,930,863 | 3/1960 | Pasieka | 200/61.53 |
| 3,117,196 | 1/1964 | Vincent | 200/61.45 R |
| 3,457,382 | 7/1969 | Boswell | 200/61.45 R |
| 3,703,102 | 11/1972 | Prachar | 73/514 |

Primary Examiner—James J. Gill
Attorney, Agent, or Firm—Fleit & Jacobson

[57] ABSTRACT

A vehicle deceleration sensing device making it possible to sense whether an occurring collision is powerful or just trivial. The device comprises a first mass body with an actuating member, a second mass body and a blocking member in the form of a cup spring preventing the second mass body from being displaced at an occurring deceleration of the vehicle until the first mass body has been displaced a predetermined distance indicating that the duration and the magnitude of said deceleration are in excess of predetermined values.

1 Claim, 5 Drawing Figures

VEHICLE DECELERATION SENSING DEVICE

The present invention relates to a vehicle carried device for sensing whether the duration and the magnitude of deceleration occurring within the vehicle will exceed predetermined values.

In safety harnesses that are used for passengers in vehicles there is often a certain slack in one or several of the bands of the safety harness. Different arrangements have been suggested to eliminate said slack by stretching the bands at the moment of collision. Completely reliable arrangement to actuate the band stretching means has, however, not yet been suggested.

Thus, the object of the present invention is to achieve a device that is able to sense in a reliable way whether an occurring collision is powerful or just trivial, said device thus making it possible to stretch the bands of the harness only at collisions of a certain magnitude.

Said object is accomplished by giving the device according to the invention the characteristics of claim 1.

The invention is based on the knowledge that the deceleration force is of different magnitude and duration at different types of collisions. Thus, at minor collisions, such as parking collisions or the like, the deceleration forces are small and short, while at more powerful collisions the deceleration forces are allowed to act upon the shock-absorbing and deformable parts of the vehicle during a relatively longer period of time. By sensing the duration and magnitude of the deceleration a measure is consequently obtained of how serious the collision is.

The invention will now be described in more detail with reference to the attached drawing showing a preferred embodiment of the invention.

Figure 1:
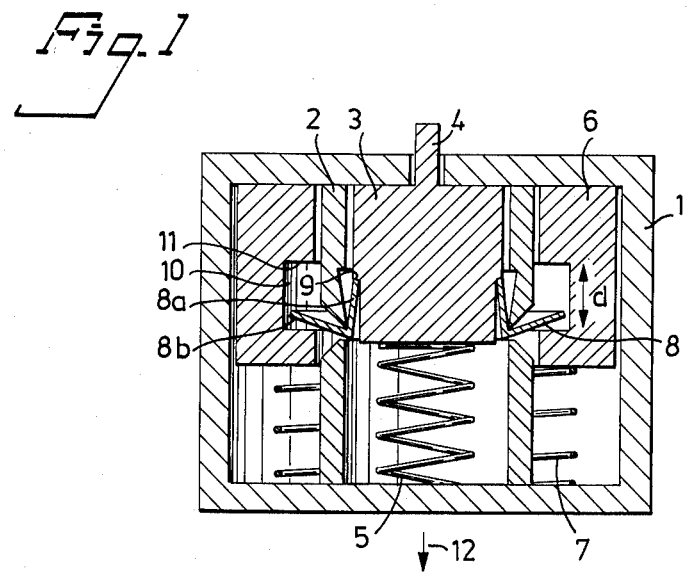
FIGS. 1 and 2 are sectional views of an embodiment of the device according to the invention, FIG. 1 showing said device in rest position and FIG. 2 showing said device when it is subjected to deceleration forces that are exceeding a predetermined value.
Figure 2:
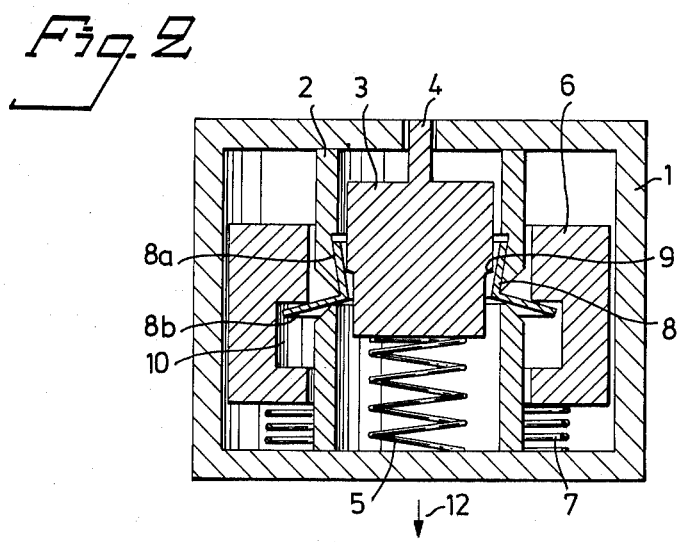

The device according to FIGS. 1 and 2 shows a cylindrical housing 1 stiffly connected to a vehicle (not shown), said housing comprising a cylinder 2. A mass body in the form of a piston 3 provided with a piston rod 4 is, against the action of a soft spring 5, movable downwards in said housing 1 from the position shown in FIG. 1 to the position shown in FIG. 2. Said piston rod 4 is displaceable through an opening in the housing 1 and is in a way not shown here connectable to means affecting the stretching of the bands of the safety harness.

A mass body in the form of a piston 6 concentrically arranged around the cylinder 2 is against the action of a rigid spring 7 movable downwards in the housing 1 from the position shown in FIG. 1 to the position shown in FIG. 2. The spring 7 is so dimensioned that the piston is able to move only if the vehicle is given a deceleration of a predetermined magnitude.

A cup spring 8 with locking tongues 8a extends through an opening in the cylinder wall 2 in such a way that the locking tongues 8a in the one position of the cup spring can be brought into engagement with an annular flange 9 of the piston 3 which because of this is prevented from moving inside the cylinder 2. The cup part 8b of the spring 8 extends into an annular recess 10 of the length d disposed in the piston 6. The recess 10 is provided with an annular rim 11 which is meant to act upon the cup apart 8b at the movement of the piston 3.

Figure 3:
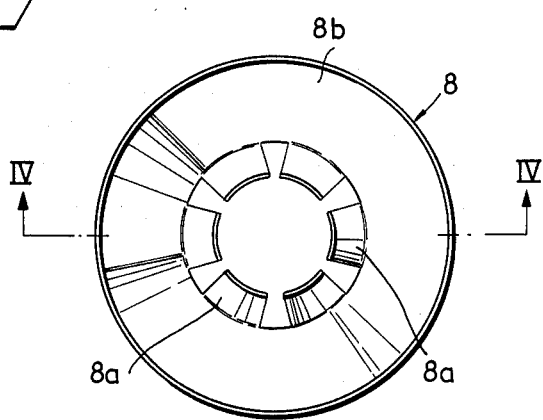
FIG. 3 is a vertical view of a cup spring being part of the device of FIGS. 1 and 2.
Figure 4:
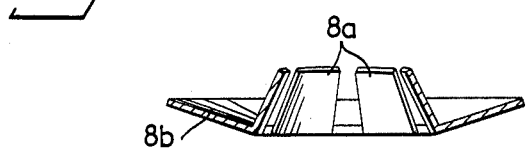
FIG. 4 is a sectional view taken along the line IV — IV of FIG. 3 and illustrates in more detail said cup spring in a first position.
Figure 5:
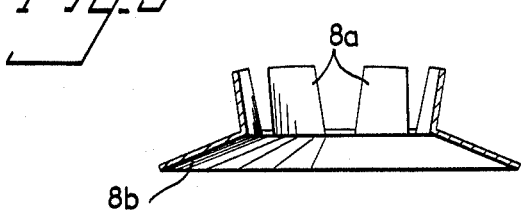
FIG. 5 shows the cup spring according to FIG. 4 in a second position.

The cup spring 8 is shown in more detail in FIGS. 3—5. The spring consists of an annular, arched cup part 8b, which in a known way can be made to take two different positions. The inner periphery of the cup part is provided with six locking tongues 8a forming a suitable angle, for instance about 90°, with the arched surface of the cup part. The locking tongues and the cup part are preferably, but not necessarily, made in one and the same part of material.

FIGS. 4 and 5 illustrate in more detail the appearance of the cup spring in the two different positions said spring can take. In the position shown in FIG. 4, see also FIG. 1, the locking tongues 8a are bearing against the flange 9 of the piston 3. In the position shown in FIG. 5, see also FIG. 2, the cup part 8b has been brought to snap over into its second position, and as a consequence of this the locking tongues are bent outwards in the direction away from the center of the cup spring.

The deceleration direction of the device has been indicated in the figures with an arrow 12.

When deceleration forces of a predetermined magnitude do occur, the mass body 6 will move downwards. If however, the deceleration forces are of short duration, the mass body 6 will not have time to move downwards far enough to affect the cup part 8b of the cup spring 8. Thus, when the deceleration forces stop, the spring 7 will return the mass body 6 to the position shown in FIG. 1 without the cup part 8b being affected. Upon prolonged deceleration of a certain magnitude, however, the mass body 6 will have time to move downwards, mainly corresponding to the distance d, until the upper rim 11 of the recess 10 will push the cup part 8b down causing said part to snap down into the position shown in FIGS. 2 and 5 so that the locking tongues 8a will be brought out of its engagement with the mass body 3. If the deceleration is continued after this, the mass body 3 can now move in the deceleration direction 12 against the action of the spring 5 as is shown in FIG. 2. The movement of the piston rod 4 can hereby, as has been indicated above, in a way known per se be used to affect means stretching the bands of the safety harness.

The invention is not limited to the described embodiment but a great number of modifications and variations thereof are possible within the scope of the appended claims.

What is claimed is:

1. A vehicle carried device for sensing and providing an indication when the duration and magnitude of vehicle deceleration exceed predetermined values comprising:
   a first mass body (6) arranged to be displaced in a first direction (12) as the result of an occurring deceleration of a certain magnitude of the vehicle;
   a second mass body (3, 4) with the ability to be displaced in said direction as the result of an occurring deceleration of the vehicle;
   blocking member means (8) movable into a predetermined stable first position for preventing displacement of said second mass body in said direction, said blocking member means comprising a cup spring with a cup part (8b) having an inner periphery and locking tongues (8a) disposed around the inner periphery to lock the second mass body (3, 4) when said blocking member means is in said predetermined stable position;

actuating member means (11) operatively associated with said first mass body for transferring the blocking member means from said first position into second position as a result of the first mass body being displaced a predetermined distance (d) by deceleration of the vehicle, said actuating member means transferring said blocking member means by moving said cup part from a first to a second position thereby freeing said locking tongues from said second mass body, the second mass body being displaceable in said direction by deceleration of the vehicle when said blocking member means is in said second position, the displacement of said second mass body providing an indication that the duration and magnitude of the deceleration of the vehicle exceed predetermined values;

rectilinear guide means (2) for guiding the movement of said first mass body and said second mass body;

a first spring (7) operatively associated with said first mass body (6), said first mass body being displaceable in said direction (12) against the action of said first spring only when the vehicle is given a deceleration of a predetermined magnitude; and a second spring (5) operatively associated with said second mass body (3, 4), said second mass body being displaceable in said direction (12) against the action of said second spring.

* * * * *